US011385116B2

United States Patent
Wiest et al.

(10) Patent No.: US 11,385,116 B2
(45) Date of Patent: *Jul. 12, 2022

(54) LUDION PRESSURE MEASUREMENT SYSTEM

(71) Applicant: The United States of America, as represented by the Secretary of the Navy, Crane, IN (US)

(72) Inventors: Aaron Wiest, Norco, CA (US); Craig Andrew Macdougall, Norco, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/032,136

(22) Filed: Sep. 25, 2020

(65) Prior Publication Data

US 2021/0088399 A1 Mar. 25, 2021

Related U.S. Application Data

(60) Provisional application No. 62/905,624, filed on Sep. 25, 2019.

(51) Int. Cl.
| G01L 7/22 | (2006.01) |
| G01L 7/18 | (2006.01) |
| G01B 11/02 | (2006.01) |
| G01L 11/00 | (2006.01) |

(52) U.S. Cl.
CPC .............. G01L 7/22 (2013.01); G01B 11/026 (2013.01); G01L 7/18 (2013.01); G01L 7/182 (2013.01); G01L 7/185 (2013.01); G01L 7/187 (2013.01); G01L 11/006 (2013.01)

(58) Field of Classification Search
CPC . G01L 7/22; G01L 7/187; G01L 7/185; G01L 7/182; G01L 7/18
See application file for complete search history.

(56) References Cited

U.S. PATENT DOCUMENTS

| 3,683,703 | A | * | 8/1972 | Lilljeforss | ................ G01L 7/22 73/713 |
| 5,152,179 | A | * | 10/1992 | Charrier | .................... G01L 7/22 374/143 |
| 2019/0012942 | A1 | * | 1/2019 | French | .................. A63H 29/22 |

* cited by examiner

*Primary Examiner* — Paul M. West
(74) *Attorney, Agent, or Firm* — Naval Surface Warfare Center, Crane Division; Eric VanWiltenburg

(57) ABSTRACT

Systems and methods for pressure measurement are provided. A ludion with a trapped gas bubble floats between two liquids. Pressure acting upon the liquids causes the bubble to expand or contract, resulting in movement of the ludion which can be measured and correlated with pressure change. Pressure measuring device can measure pressures from 0.05 inHg to 110 inHg with a four-to-one Test Accuracy Ratio (TAR) without using mercury.

10 Claims, 1 Drawing Sheet

LUDION PRESSURE MEASUREMENT SYSTEM

CROSS-REFERENCE TO RELATED APPLICATIONS

The present application claims priority to U.S. Provisional Patent Application Ser. No. 62/905,624, filed Sep. 25, 2019, entitled "Ludion Pressure Measurement System," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,617) is assigned to the United States Government and is available for licensing for commercial purposes. Licensing and technical inquiries may be directed to the Technology Transfer Office, Naval Surface Warfare Center Corona Division, email: CRNA_CTO@navy.mil.

FIELD OF THE INVENTION

The current disclosure is directed to pressure measurement systems, and more particularly to pressure measurement systems based on a linear displacement device.

SUMMARY OF THE INVENTION

Many embodiments of the present invention are directed to pressure measurement systems, and more particularly to pressure measurement systems based on a linear displacement device.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present apparatus and methods will be better understood by reference to the following detailed description when considered in conjunction with the accompanying data and figures, which are presented as exemplary embodiments of the disclosure and should not be construed as a complete recitation of the scope of the inventive method, wherein.

DETAILED DESCRIPTION

Figure 1:
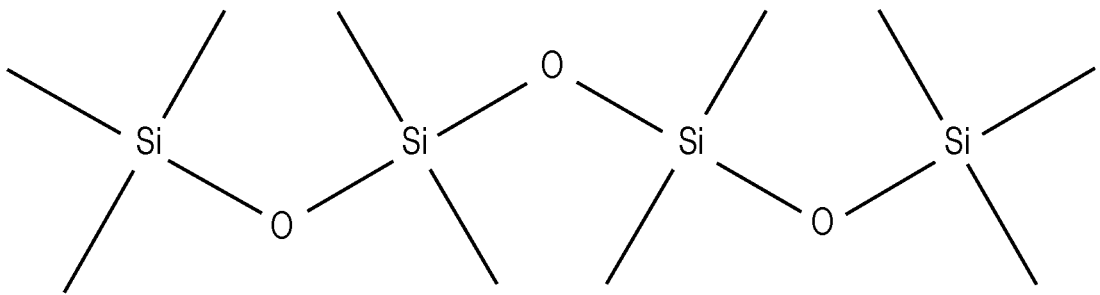
FIG. 1 provides a schematic illustration of decamethylterasiloxane, in accordance with embodiments.

Turning now to the drawings, systems and methods for pressure measurement are provided. In many embodiments the pressure measuring device can measure pressures from 0.05 inHg to 110 inHg with a four-to-one Test Accuracy Ratio (TAR) without using mercury.

The LPS measures pressure by measuring linear displacement of an artifact, called a "ludion", which responds to a change in pressure and translates the measured linear change into a change in pressure. During operation the LPS uses two immiscible liquids of different densities (like oil and water) in a pressure vessel. One floats on top of the other in the pressure vessel. The ludion is made so that it "floats" at the boundary layer between the oil and water. It contains a trapped bubble of gas which is in contact with the liquid(s) so that the bubble will expand or contract with changing pressure applied to the top of the liquids. An upside down test tube with a small bubble inside is one notional way to picture this. A mirror is attached to the ludion so that a laser interferometer can be used to measure any change in position when the ludion rises or sinks due to its bubble expanding or contracting. To calibrate the system and establish the relationship between vertical position and a change in pressure:

- The applied gas pressure to the system is held constant and additional liquid (oil) is introduced to raise the height of the upper liquid which adds hydrostatic pressure.
- The change in height ($\Delta h$) of the liquid (oil) is measured with a second interferometer reflecting from a mirror attached to a "boat" floating on the top of the upper liquid.
- Measurements of the density ($\rho$) of the upper liquid as well as the acceleration due to gravity (g) allows direct measurement of the added hydrostatic pressure ($\Delta h * g * \rho$).
- The added pressure is associated with the change in position of the ludion. Repeating this process over the required range establishes the needed relationship.

The accuracy and precision of the LPS has fundamental limits due to how well we can measure gravity, the density of the upper liquid, and the wavelength of laser light. In addition to these inescapable constraints, others degrade the system due to design or set up; such as, aligning the interferometry path with the path of motion (cosine error) and maintaining a constant temperature within the system. Still others are a result of not-quite-perfect assumptions; like, treating the bubble as an ideal gas, and assuming the upper liquid is incompressible.

Fundamental Limits of Precision and Accuracy

The cornerstone of all subsequent pressure measurements with the LPS rests on how it is calibrated ($\Delta h * g * \rho$).
  Gravity. In September of 2016 the NOAA/National Geodetic Survey measured the acceleration due to gravity at the spot we intend to test the LPS to be $9.79548055 \pm 0.000000077$ m/s$^2$
  Density. In March of 2019 the Navy Primary Standards Laboratory measured the density of the upper liquid (decamethyltetrasiloxane) at the temperature we intend to use (0° C.) on an Anton Paar 5000M to be $0.872992 \pm 0.000007$ g/cm$^3$.
  Position. There are three possible ways to address measurement uncertainty in position, given the change in position of the ludion is based on interferometry. The highest precision achieved by anyone is within the LIGO experiment in search of gravity waves, which measures change in position to 0.000000000000000001 meter accuracy. The change in position is measured in the prototype using an Agilent heterodyne helium-neon laser with an eight-folded displacement path submerged in the upper liquid. The index of refraction of the upper liquid is provided by the manufacturer as 1.3874. While standard practice is to provide this number at 589 nm (the yellow doublet D-line of sodium) at atmospheric pressure, at 20° C., the manufacturer has not been able to confirm these assumptions. If we had access to equipment to measure the index of refraction of the upper liquid, say with an Anton Paar Abbemat 650, which has an accuracy of ±0.00002, we could determine the wavelength of our laser in the decamethyltetrasiloxane at the temperature we intend to calibrate the instrument. (wavelength (in vacuum)/index of refraction)

Currently the National Institute for Standards and Technology (NIST) uses a mercury manometer as the national standard for measuring pressures. Its range goes both below and above the Ludion's target. At 0.05 inHg the national standard is accurate to +/−1.79×10-6 inHg (or about 36 parts per million). At 100 inHg the national standard is accurate to +/−5.200×10-4 inHg (or about 5 parts per million).

The US Navy uses Schwien mercury manometers (model 1025LX110-2) to calibrate various pressure gauges. The Schwien uses approximately 60 pounds of mercury, has a range of 0.05 inHg to 100 inHg. Its accuracy is 15 parts per thousand (+/−7.5×10-7 inHg at the low end and +/−1.5×10-3 inHg on the high end). The US Navy also uses Schwien mercury manometers (model 1025FX110-2) to calibrate various pressure gauges. According to METPRO the Navy uses the Schwien in nine (9) calibration procedures. The Schwien uses approximately 60 pounds of mercury, has a range of 0.05 inHg to 110 inHg. Its accuracy is ±0.0003 inHg ±0.003% indicated value (+/−3.15×10-4 inHg at the low end and +/−3.6×10-3 inHg on the high end). According to METPRO the Navy uses the Schwien 1025FX110-2 in nine (9) calibration procedures requires a pressure standard capable of achieving a four-to-one TAR for pressure gauges over the entire range in use within the Navy.

Theoretical calculations suggest the Ludion Pressure Standard will exceed the four-to-one TAR over the entire pressure range.

Embodiments Implementing the Ludion Pressure Standard (LPS)

The purpose in providing such a detailed description of how the LPS operates is to allow the opportunity to evaluate whether or not all the relevant aspects of accuracy and precision claims are addressed and addressed correctly.

Embodiments involve measuring the movement of two floating artifacts with laser interferometry. One of these artifacts is called the "ludion" the other is called the "boat". Each of these artifacts has an incorporated retro-reflector (aka a corner cube) to reflect laser light so that its position (or rather the change in its position) can be measured.

Known Sources of Error/Uncertainty

Embodiments of ludion-based pressure measurement systems demonstrate the following sources of error and uncertainty:
1) The liquids have a small amount of compressibility (See, e.g., https://iopscience.iop.org/article/10.108810022-372714/7/3081pdf);
   1a) The pressure per unit of hydrostatic liquid column of $L_a$ is not constant,
   1b) The index of refraction varies as a function of depth through the liquid,
2) The temperature of the system varies;
3) The amount of Helium in the bubble changes as Helium will dissolve into the liquid;
4) The cross-sectional area of the ludion at the plane of the vinculum is not constant; and
5) The line defined by the center of buoyancy and center of mass of the ludion changes as the ludion rises and falls due to asymmetry in the machining of the ludion.

EXEMPLARY EMBODIMENTS

Although specific embodiments of pressure systems are discussed in the following sections it will be understood that these embodiments are provided as exemplary and are not intended to be limiting.

Materials

Decamethyltetrasiloxane: Chemical Name: 1,1,1,3,3,5,5,7,7,7-Decamethyltetrasiloxane Molecular Formula: $C_{10}H_{30}O_3Si_4$ Molecular Weight: 310.687 g/mol. (See, FIG. 1)

TABLE 1

Density Measurements

| Temperature | Density |
| --- | --- |
| 0.004 C. | 0.872992 g/cc |
| 1.107 C. | 0.871897 g/cc |
| 2.217 C. | 0.870791 g/cc |
| 3.328 C. | 0.869686 g/cc |
| 4.439 C. | 0.868578 g/cc |

[measurements taken 7 MAR. 2019 at the Naval Primary Standards Lab by On an Anton-Parr 5000M, serial number: 81118090. Uncertainty: ±0.00005 g/cc]

Compressibility is the fractional change in volume per unit increase in pressure. For each atmosphere increase in pressure, the volume of water would decrease 46.4 parts per million. The compressibility k is the reciprocal of the Bulk modulus, B. (See, Sears, Zemansky, Young and Freedman, University Physics, 10th Ed., Section 11-6, the disclosure of which is incorporated herein by reference. A table of compressibility values are provided in Table 2, below.

TABLE 2

Compressibility Values

| Liquid | Compressibility, k | |
| --- | --- | --- |
|  | $Pa^{-1} \times 10^{-11}$ | $Atm^{-1} \times 10^{-6}$ |
| Carbon disulfide | 93 | 94 |
| Ethyl alcohol | 110 | 111 |
| Glycerine | 21 | 21 |
| Mercury | 3.7 | 3.8 |
| Water | 45.8 | 46.4 |

An assumption of incompressibility was considered for this silicone fluid. The following table shows the data received.

TABLE 3

Compressibility Measurements

| | % Compressibility (as ΔV/Vo × 100) | | | | | | |
|---|---|---|---|---|---|---|---|
| Pressure Psi | 0.65 cSt | 1 cSt | 2 cSt | 100 cSt | 350 cSt | 1,000 cSt | 12500 cSt |
| 0 | 0 | 0 | 0 | 0 | 0 | 0 | 0 |
| 7,111 | 6.34 | 5.36 | 4.85 | 4.49 | 4.47 | 4.58 | 4.46 |
| 14,223 | 10.04 | 8.84 | 8.21 | 7.34 | 7.42 | 7.36 | 7.29 |
| 21,334 | 12.59 | 11.39 | 10.69 | 9.46 | 9.55 | 9.47 | 9.33 |
| 28,446 | 14.62 | 13.41 | 12.67 | 11.2 | 11.28 | 11.23 | 11.04 |
| 35,557 | 16.33 | 15.08 | 14.34 | 12.71 | 12.78 | 12.74 | 12.53 |
| 42,669 | 17.82 | 16.51 | 15.79 | 14.02 | 14.11 | 14.03 | 13.84 |
| 49,780 | 19.16 | 17.76 | 17.05 | 15.19 | 15.26 | 15.17 | 15 |
| 56,892 | 20.44 | 18.84 | 18.17 | 16.2 | 16.27 | 16.18 | 16.02 |

The units "cSt" represent viscosity of the various silicone fluids they tested; it stands for centi-Stokes. Water is about 1 cSt whereas honey is about 10,000 cSt. The particular silicone fluid we acquired is rated at 1.5 cSt. There are several problems with using this data.

1) 1.5 cSt data is not provided;
2) The pressure range is beyond what will be used (0 psi to 60 psi);

Using Microsoft Excel, a regression analysis on the 1 cSt and 2 cSt data was performed to find a function that mapped a pressure to a compressibility for each. The 1 cSt function has been used as an upper bound and the 2 cSt function as a lower bound. The average of the two is what we consider to be the compressibility of our silicone fluid at the given pressure.

The regression analysis started by using Excel's Solver to find three fitting parameters (E, C, and D) for the given data using the following relationship:

$$\text{pressure} = C^{\frac{compressibility+E}{D}} - C^{\frac{E}{D}} \quad (EQ. 1)$$

Fitting the parameters used the "GRG Nonlinear" method by minimizing the sum of the squares of the differences between the calculated compressibility and the empirically provided compressibility. Since the pressure range of interest is so skewed to low pressures. The sum of the squares was weighted with the 7,111 psi square of the difference data point multiplied by 100 and the 14,223 psi data point multiplied by 10. After the fitting parameters were calculated: (1 cSt C=3.0649472, D=11.0133601, E=90.3627125; 2 cSt C=2.9047222, D=11.0263149, E=96.9871322) the relationship was manipulated into a more useful form:

$$\text{compressibility} = \frac{DLn\left(\text{pressure} + C^{\frac{E}{D}}\right)}{Ln(C)} - E \quad (EQ. 2)$$

1 cSt compressibility function: compressibility=9.83309 Ln(pressure+9,795.27)−90.362713
2 cSt compressibility function: compressibility=10.3404 Ln(pressure+11,842.79)−96.987132

Polyethylene glycol (PEG). Also known as: polyethylene oxide, polyoxyethylene.
Molecular Formula: $C_{2n}H_{4n+2}O_{n+1}$.
Molecular Weight: 18.02+44.05 n g/mol
Density: 1.125 g/cc One reason for using PEG is its low chemical hazard rating. Although its use here does not involve any human contact, many consumer products contain PEG. From laxatives, to toothpaste, to lotions.

Calibration Methods

Here is some math relevant to calibration. In operation the ludion pressure measuring system (lpms) will use two interferometers to measure differences in distances for two different vertical distances. The "z" measurement is from some fixed point to the bottom of the ludion, the "y" measurement is from some fixed point to the top of the upper fluid (decamethyltetrasiloxane), aka "La" for $Liquid_{above}$. In operation an initial vacuum will be pulled on the system until La starts to boil/volatilize. Although the pressure at which La volatilizes is a constant at a fixed temperature, measurements of this pressure are not available with a high enough precision to be useful in setting our calibration. Therefore, we assume the starting pressure is unknown and can derive it from subsequent changes in "z" and "y". The following bit of math is the formalism for this assertion.

Measurement units are sometimes awkward within the discussion. To aid in clarity of the math all of the units have been rationalized.
- all distances are measured in centimeters (cm)
- all areas are measured in square centimeters ($cm^2$)
- all volumes are measured in cubic centimeters (cc)
- all masses are measured in grams (g)
- all densities are measured in grams per cubic centimeter (g/cc)
- all temperatures are measured in Kelvins (K)
- all numbers of atoms are measured in moles (mol)
- all pressures are measured in grams per centimeter seconds squared (g/cm $s^2$) (note: 10 Pascals=1 g/cm $s^2$). So, pressure units are equivalent to decaPascals (i.e. 1 g/cm $s^2$=1 daPa).

There are some known constants that will be used: g is the acceleration due to gravity. (979.548055 cm/$s^2$); and R is the gas constant.

Figure 2:
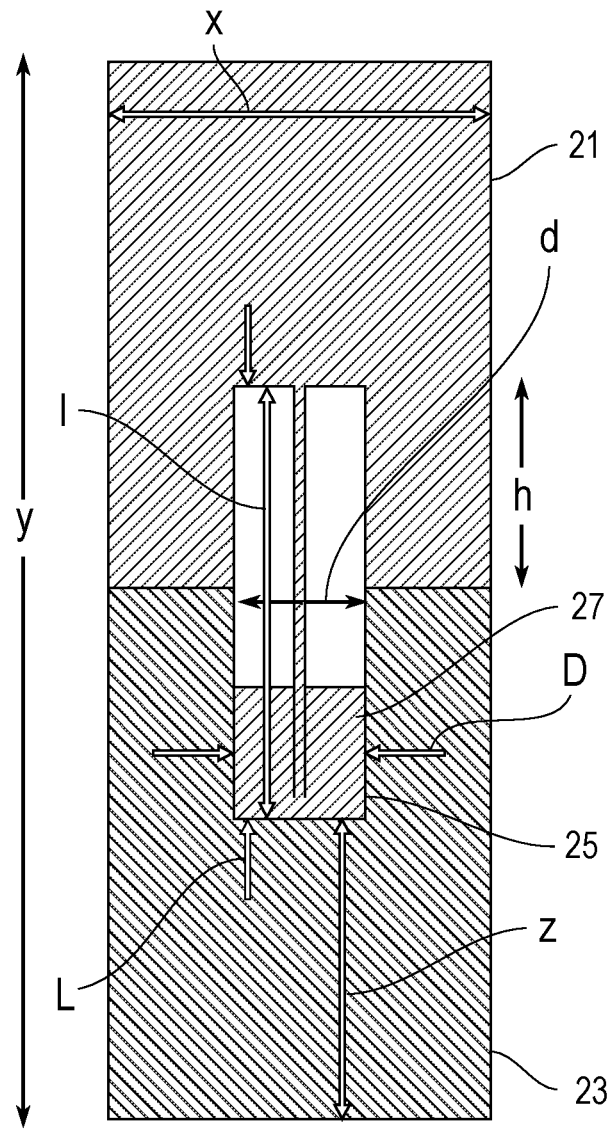
FIG. 2 provides a schematic illustration of a ludion pressure measurement system in accordance with embodiments.

An idealized ludion, as shown in FIG. 2, can be considered to be a hollow right cylinder with circular discs at both ends, where:
- the inside diameter of the ludion is expressed as "d"
- the outside diameter of the ludion is expressed as "D"
- the inside diameter of the vessel is expressed as "x"
- the height of the inside cavity of the ludion is expressed in the math as "I"
- the height of the outside of the ludion is expressed in the math as "L"
- the density of the decamethyltetrasiloxane is expressed in the math as ρ
- the density of the propylene glycol is expressed in the math as ρ
- the inside cross-sectional area of the ludion is expressed in the math as "a" (i.e. $\pi(d/2)^2$)
- the outside cross-sectional area of the ludion is expressed in the math as "A" (i.e. $\pi(D/2)^2$)
- the inside cross-sectional area of the vessel is expressed in the math as "X" (i.e. $\pi(x/2)^2$)
- the distance between the top of the ludion and the vinculum is expressed in the math as "h"
- the height/position of the ludion is expressed in the math as "z"
- the height/position of the top of the decamethyltetrasiloxane is expressed in the math as "y"

the mass of an empty ludion is expressed in the math as "m"

the mass of the ludion including any liquids inside of it, is expressed in the math as "M"

the volume of the bubble of helium within the ludion is expressed in the math as "V"

the pressure of the bubble of helium within the ludion is expressed in the math as "P"

The ludion 25 finds its equilibrium position when the gravitational force is balanced by the buoyant force. When the gravitational force (F↓=Mg) is equal to the buoyant force (F↑=(mass of displaced liquids)g); and:

$$M = Ah\rho + A(L-h)\rho \quad \text{(EQ. 3)}$$

Where:

$m+$(volume of decamethyltetrasiloxane inside ludion)
$\rho = Ah\rho + A(L-h)\rho$ $m + (al - V)\rho = Ah\rho + A(L-h)\mathbf{92}$ $m + al\rho - V\rho = Ah\rho + AL\rho - Ah\rho$ $Ah\rho - Ah\rho = AL\rho - m + V\rho - al\rho$ $Ah(\rho - \rho) = AL\rho - m + V\rho - al\rho$ $hA(\rho - \rho) - AL\rho + m + al\rho = V\rho$ Let the constants $(A(\rho-\rho))/\rho = \varphi$ Let the constants $(-AL\rho + m + al\rho)/\rho = \psi$ This gives us the linear equation:

$$\varphi h + \psi = V \quad \text{(EQ. 3)}$$

Relating the position of the ludion to the volume of the bubble 27 within the ludion 25. (This assumes the liquids are incompressible, i.e. their densities are constant, as well as assuming a constant temperature.)

Relationship (EQ. 3) is true with arbitrarily different paired values of h and V such that:

$\varphi h_1 + \psi = V_1$ and $\varphi h_2 + \psi = V_2$ $(\varphi h_2 + \psi) - (\varphi h_1 + \psi) = V_2 - V_1$ $(\varphi h_2 - \varphi h_1) + (\psi - \psi) = V_2 V_1$ where:

$$\varphi \Delta h = \Delta V \quad \text{(EQ. 4)}$$

As the ludion sinks into the bottom liquid 23, the propylene glycol, the top of the ludion goes down reducing h, and the vinculum rises which also reduces h such that:

$$\Delta h = \Delta z + \Delta z(A/X - A) \quad \text{(EQ. 5)}$$

$$\Delta h = \Delta z(1 + (A/X - A)) \quad \text{(EQ. 6)}$$

If $\xi$ is set equal to the set of constants $\varphi$ $(1+(A/X-A))$, the relationship in EQ. 4 can be set as:

$$\xi \Delta z = \Delta V \quad \text{(EQ. 7)}$$

This indicated that it is possible to actually measure $\Delta z$ with one leg of our interferometer. When $\Delta V$ is negative, this means top liquid 21 (e.g., decamethyltetrasiloxane) is being forced into the ludion due to increased pressure. The $\Delta V$ can equally represent the reduction in volume of the helium or the volume of decamethyltetrasiloxane entering the ludion by reversing the sign. As decamethyltetrasiloxane enters the ludion, y, the distance to the top of the decamethyltetrasiloxane, becomes smaller.

$$X \Delta y = \Delta V \quad \text{(EQ. 8)}$$

The total pressure ($P_T$) on the bubble in the ludion is the sum of the hydrostatic pressure ($P_h$), the gas pressure the system is measuring ($P_g$), and the vapor pressure of the decamethyltetrasiloxane ($P_v$). The total pressure of the bubble ($P_B$) is the pressure of the helium gas in the bubble ($P_{He}$) plus the vapor pressure of the decamethyltetrasiloxane.

$$P_h + P_g + P_v = P_{He} + P_v \quad \text{(EQ. 9)}$$

When calibrating, the system is drawn down to the vapor pressure of the decamethyltetrasiloxane with a vacuum pump. As the decamethyltetrasiloxane volatilizes $P_g$ approaches 0 with continued pumping. Since hydrostatic pressure $P_h = y\rho g$ and the vapor pressure is the same both in the ludion and at the top of the vessel such that:

$P_{He} = P_h$ (under "vacuum")

If the vapor pressure of the decamethyltetrasiloxane at the operating temperature (0° C.) is known, none of the mathematical operations would be necessary; however the vapor pressure is not known with enough precision to be useful, so it is necessary to determine the vapor pressure empirically.

Assume $P_T=4$ psi with $P_h=2$ psi, $P_g=0$ psi, and $P_v=2$ psi. This would mean $P_{He}$ is also 2 psi. If the hydrostatic pressure is doubled ($P_h=4$ psi), this would change the bubble pressure to ($P_B$) to 6 psi. The volume of the bubble would have to shrink by ⅓ of its volume for this to happen. Assuming the bubble in the ludion behaves as an ideal gas, PV=nRT (the ideal gas equation), then:

$$P_1 V_1 = P_2 V_2 \quad \text{(EQ. 10a)}$$

$$P_1/P_2 = V_2/V_1 \quad \text{(EQ. 10b)}$$

So, . . .

$[(P_v P_{h1})/(P_v + P_{h2})] = [V_2/V_1]$ $[(P_v + P_{h1})/(P_v + P_{h1} + \Delta P)] = [(V_1 + \Delta V)/V_1]$ (but $P_v$, $P_{h1}$, or $V_1$ are not known).

Since $\Delta P = \Delta y \rho g$ and can be measured and $\xi \Delta z = \Delta V$ it is possible to make progress by making successive measurements. $\Delta y$ and $\Delta z$ also can be measured, the rest of the terms are constants:

$$[(P_v + P_{h1})/(P_v + P_{h1} + \Delta y_2 \rho g)] = [(V_1 + \xi \Delta z_2)/V_1] \quad \text{(EQ. 11)}$$

$\Delta y$ and $\Delta z$ can be measured, the rest of the terms $(P_v, P_{h1}, \rho g V_1 \xi)$ are constants and since $\rho$ g are known it is possible to determine the other four constants by adding some additional decamethyltetrasiloxane to the system and measuring $\Delta y$ and $\Delta z$ four times to generate 4 linearly independent equations so the four unknown constants can be determined.

$$[(P_v + P_{h0})/(P_v + P_{h0} + \Delta y_1 \rho g)] = [(V_0 + \xi \Delta z_1)/V_0] \quad \text{(EQ. 12a)}$$

$$[(P_v + P_{h0})/(P_v + P_{h0} + \Delta y_2 \rho g)] = [(V_0 + \xi \Delta z_2)/V_0] \quad \text{(EQ. 12b)}$$

$$[(P_v + P_{h0})/(P_v + P_{h0} + \Delta y_3 \rho g)] = [(V_0 + \xi \Delta z_3)/V_0] \quad \text{(EQ. 12c)}$$

$$[(P_v + P_{h0})/(P_v + P_{h0} + \Delta y_4 \rho g)] = [(V_0 + \xi \Delta z_4)/V_0] \quad \text{(EQ. 12d)}$$

where $(P_v + P_{h0})$ is always the same so it is not linearly independent.

If the system is under "vacuum", then:

$$\Delta P = \Delta y \rho g \quad \text{(EQ. 13a)}$$

$$\Delta P = (\xi \Delta z \rho g)/X \quad \text{(EQ. 13b)}$$

If some additional decamethyltetrasiloxane was introduced into the system to raise the level of the top of the decamethyltetrasiloxane a distance of y', then Δy would equal y', assuming the additional liquid added no hydrostatic pressure to the ludion. This is also good, because it is possible to directly measure Δy with the other leg of our interferometer. Assuming the bubble in the ludion behaves as an ideal gas, PV=nRT (the ideal gas equation)

$$V = nRT/P \quad \text{(EQ. 14a)}$$

$$\Delta V = nRT/\Delta P \quad \text{(EQ. 14b)}$$

$$(\text{using EQ. 7}) \; \xi \Delta z = nRT/\Delta P \quad \text{(EQ. 15)}$$

Let the constants $\rho n R T = 1/\xi$ yields:

$$\varphi h + \psi = 1/\xi P \quad \text{(EQ. 16)}$$

The pressure of the Helium bubble is the sum of hydro-static pressure from the column of La above the boundary layer between La and Lb (this boundary layer we call the "vinculum") and the vapor pressure of the decamethyltetrasiloxane.

DOCTRINE OF EQUIVALENTS

While several alternative configurations for ludion pressure systems have been depicted, it should be clear that any of a variety of system configurations can be implemented in accordance with many embodiments of the invention.

More generally, as can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A pressure measurement system comprising:
   a first container;
   a first liquid disposed within the first container;
   a second liquid disposed within the first container; and
   a second container formed with a cavity and an aperture, wherein the second container is disposed within the first container;
   wherein the cavity opens to an exterior of the second container through the aperture;
   wherein a gas is disposed within the cavity such that the gas is trapped within the second container by pressure; and
   wherein the second container includes a reflective section on an outer surface of the second container, the reflective section comprising a reflector configured to reflect laser light such that a laser interferometer can be used to measure any change in position of the second container when the second container rises or sinks due to expansion or contraction of the gas disposed within the cavity.

2. The pressure measurement system of claim 1, wherein the first liquid and the second liquid are immiscible such that a boundary layer forms between the first liquid and the second liquid.

3. The pressure measurement system of claim 2, wherein the second container has a first density and the gas has a second density and a first mass, wherein the first density, second density, and first mass are selected such that a first portion of the second container floats above the boundary layer and a second portion of the second container floats below the boundary layer.

4. The pressure measurement system of claim 1, wherein the first liquid is decamethyltetrasiloxane and the second liquid is polyethylene glycol (PEG).

5. The apparatus of claim 1, wherein the gas comprises helium.

6. The apparatus of claim 1, wherein the reflector comprises one of a mirror or a retro-reflector.

7. A method of measuring pressure comprising:
   providing a first container;
   pouring a first liquid and a second liquid into the first container, where the first and second liquids are immiscible and the first liquid floats above the second liquid;
   providing a second container formed with a cavity and an aperture extending from the cavity to an exterior top side of the second container;
   filling the cavity with the first liquid;
   inserting a predetermined amount of a gas in the cavity;
   submerging the first container within the first and second liquids wherein the aperture at the exterior top side of the second container is in contact with the first liquid;
   placing the first container in a space having an unknown pressure; and
   recording a displacement of the second container to determine the pressure of the space.

8. The method of claim 7, wherein recording the displacement of the second container further comprises providing a reflective section on an outer surface of the second container, and directing laser light at the reflective section from a laser interferometer to measure the displacement of the second container.

9. A method of measuring pressure comprising:
   providing a pressure measurement system comprising:
      a first container;
      a first liquid disposed within the first container;
      a second liquid disposed within the first container; and
      a second container formed with a cavity and an aperture, wherein the second container is disposed within the first container;
      wherein the cavity opens to an exterior of the second container through the aperture;
      wherein a gas is disposed within the cavity such that the gas is trapped within the second container by pressure;
   drawing down pressure in the first container to a vapor pressure of the first liquid for calibration;
   placing the first container in a space having an unknown pressure; and
   recording a displacement of the second container to determine the pressure of the space.

10. The method of claim 9, wherein recording the displacement of the second container further comprises providing a reflective section on an outer surface of the second container, and directing laser light at the reflective section from a laser interferometer to measure the displacement of the second container.

* * * * *